UNITED STATES PATENT OFFICE.

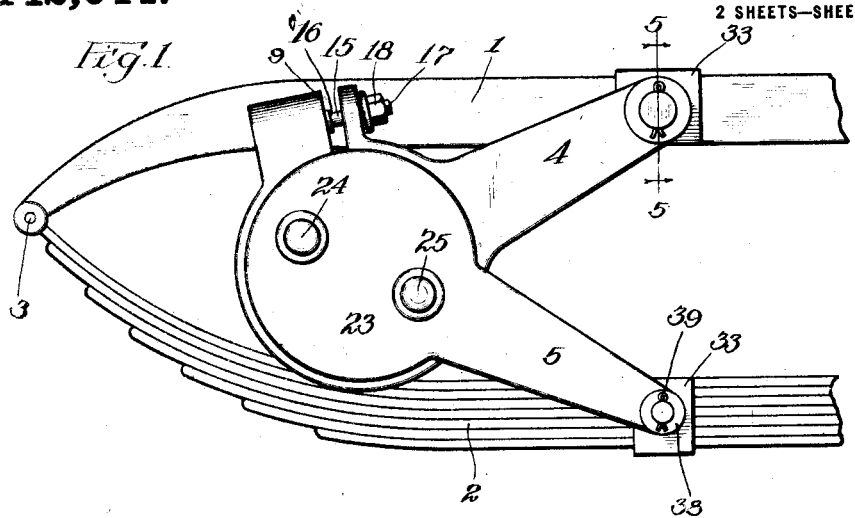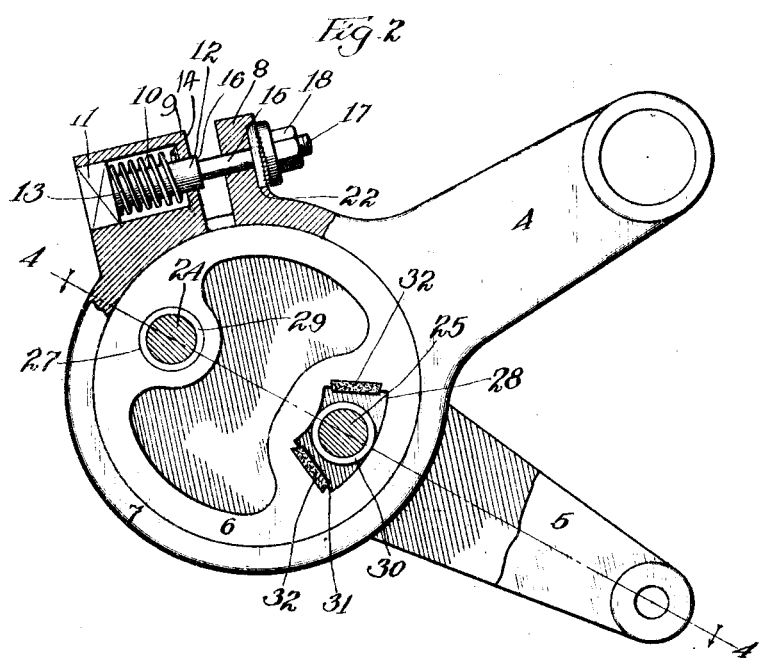

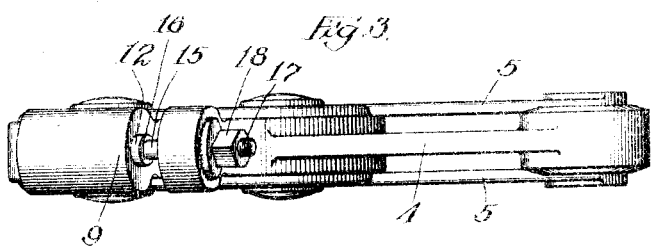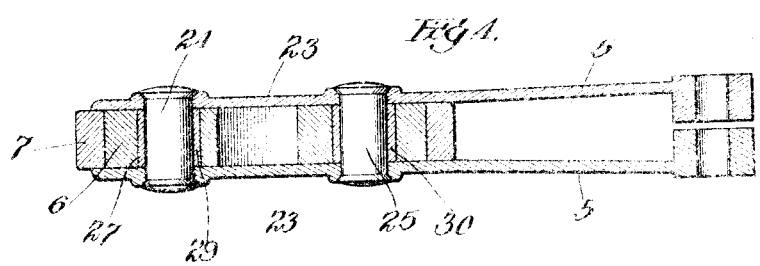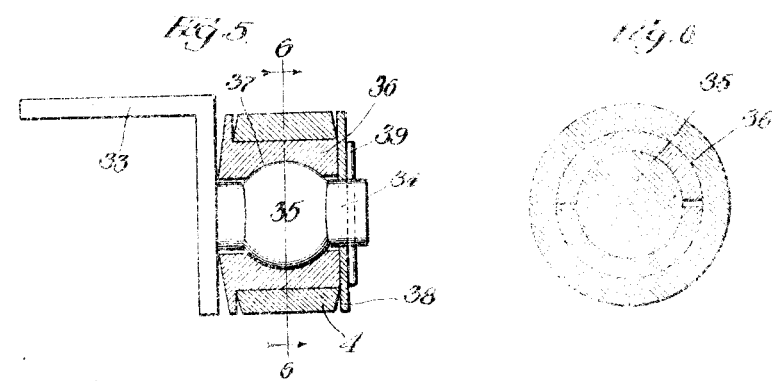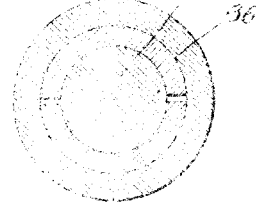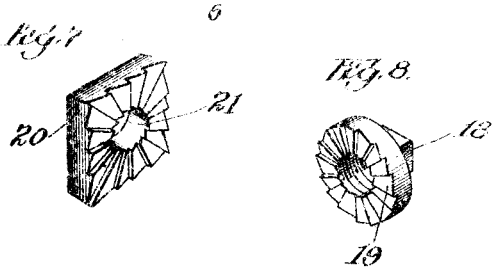

JOHN A. McKNIGHT, OF CHICAGO, ILLINOIS, ASSIGNOR, BY MESNE ASSIGNMENTS, TO SPRING GOVERNOR COMPANY, OF CHICAGO, ILLINOIS, A CORPORATION OF ILLINOIS.

SHOCK-ABSORBER.

1,142,044.  Specification of Letters Patent.  Patented June 8, 1915.

Application filed June 4, 1914. Serial No. 843,113.

*To all whom it may concern:*

Be it known that I, JOHN A. McKNIGHT, a citizen of the United States, residing at Chicago, county of Cook and State of Illinois, have invented certain new and useful Improvements in Shock-Absorbers, of which the following is a specification.

The essential object of this invention is to provide a shock absorber in which friction is produced between two co-acting members and in which one of the friction-producing members can be tightened in place so as more firmly to grip or engage the other co-acting member but which, when tightened to the desired point, can be permanently locked in the desired position.

In the drawings, Figure 1 is a side elevation of the invention showing the same applied to one of the leaf springs and the supporting arm of a vehicle; Fig. 2 is a view partly in section and partly in elevation showing the interior construction; Fig. 3 is a top plan view looking downwardly from above in either Figs. 1 or 2; Fig. 4 is a section on the line 4—4, Fig. 2; Fig. 5 is a section on the line 5—5, Fig. 1; Fig. 6 is a section on the line 6—6, Fig. 5; and Figs. 7 and 8 are perspective views of the locking members.

The supporting arm 1 and the leaf spring 2 are pivotally connected at 3, and the shock absorber is preferably fastened to both of the members 1 and 2, and in such manner that the spring 2 may move toward the arm 1 for a relatively short distance without producing friction, but when the spring moves beyond a predetermined point, the resistance of the shock absorber must be overcome. The arm 4 is pivotally connected with the carrier 1 and the arm 5 with the spring 2, and when the right hand ends of arms 4 and 5 move toward or away from each other beyond a predetermined point, a certain amount of friction must be overcome.

Formed integrally with the arm 4 and encircling and engaging the annular plate 6 is the friction band 7 which is provided with lugs 8 and 9. When the members 8 and 9 are drawn relatively close together, the band 7 grips the plate 6 very tightly, but when the members 8 and 9 are permitted to be spaced apart from each other, the tension is thereby reduced. In the lug 9 is a recess 10, which recess is square or hexagonal, and the head 11 which is formed upon the bolt 12 is received within the recess 10. The head 11 and recess 10 correspond in shape so as to make it impossible for the member 12 to rotate, and the helical spring 13 is interposed between the web 14 and the head 11, the object of said spring 13 being to force the head 11 and the bolt 12 normally toward the left, Fig. 2.

Extending outwardly from the bolt 12 is the shank 15, which is smaller in diameter than the bolt 12, leaving a shoulder 16 at the junction of the shank 15 and bolt 12, and the end 17 of the shank 15 is screw-threaded so as to receive the nut 18 which carries the toothed face 19. The toothed face or plate 19 coöperates with the toothed plate 20, which plate 20 is perforated at 21 so that the shank 15 can pass therethrough. Said member 20 is square or of some other non-circular shape and is received within a recess 22 in the lug 8, which said recess holds the plate 20 against rotation. When the device is being adjusted a wrench is applied to the nut 18 and the same turned upon the screw-threaded end 17 of the shank 15. As the same is turned the teeth upon the face 19 lock with the teeth upon the plate 20 and thus prevent unlocking or loosening of the nut 18.

The arm 5 is preferably made in two parts or sections, as best shown in Figs. 3 and 4, and each section terminates in a circular plate 23. These two plates 23 are cross-connected by bolts 24 and 25, which bolts pass through the annular disk 6 which is encircled by the friction band 7. It will be obvious from the drawings that the friction band 7 and disk 6 are interposed between the two circular members 23. The bolts 24 and 25, which are each fastened at both ends to the plates 23, pass through perforations in the disk 6, bolt 24 being received in perforation 27 and bolt 25 in perforation 28. Bolt 24 is surrounded by an anti-friction sleeve 29 and bolt 25 by a similar sleeve 30. The perforation 27 within which the bolt 24 is received is of just sufficient size to receive the sleeve 29, whereas the perforation 28, as best shown in Fig. 2, is somewhat larger than the sleeve and is arcuate in shape. At each end of the arc the perforation 28 is provided with a wedge-shaped notch 31 and a piece of felt or other non-metallic packing 32 is retained in each notch 31.

If the movement of the vehicle is such that the leaf spring 2 is carried upwardly toward the supporting arm 1, the arms 5 will swing in a counter-clockwise direction and will rotate through a few degrees of arc without causing any friction, because said arms 5 will swing upon the bolts 24 as a pivot until such time as the bolt 25 or the sleeve carried thereupon strikes the packing 32 nearest the top of Fig. 2. Further movement of the arm 5 in a counterclockwise direction causes the ring 6 to rotate within the friction band 7 and in that manner produces the necessary frictional resistance. As the leaf spring 2 descends, the arm 5 will move in a clockwise direction until such time as the bolt 25 or the sleeve 30 strikes the packing 32, which is nearest the bottom of Fig. 2. It will be obvious that the arm 5 may move in either direction without producing any motion of the ring 6 until such time as the bolt 25 strikes one end or the other of the arcuate slot 28 and that after said bolt does strike and engage the end wall of the slot, the arm 5 and ring 6 must rotate in unison, which motion is against the frictional resistance of the clamping band 7. The arm 5, in other words, is permitted to move a certain limited distance before producing any frictional resistance, but when it has moved beyond that distance, friction arises and must be overcome.

In order most conveniently to mount the shock absorber so as to permit the necessary play, the device best shown in Figs. 5 and 6 is provided. The angle bracket 33 is secured in any suitable way to the supporting arm 1 or leaf spring 2 (as, for example, by bolts or screws not shown in the drawings) and projecting outwardly from this said angle bracket 33 is an arm 34 which carries the ball 35. A socket 36, concaved at 37 to receive the ball 35 encircles the arm 34 and ball 35, and the arm 4 or 5, as the case may be, is secured to the socket member 36, being retained in place by the plate 38 and linch-pin 39. The construction just described permits the arms 4 and 5 to have a certain amount of lateral play and thus makes the invention more efficient than would be the case if the shaft 34 or its equivalent were of ordinary cylindrical construction. The sideswaying of the vehicle, therefore, will not cause the shock absorber to snap or shear the arms 34, for when there is any side swaying or side motion, the ball-and-socket arrangement, shown in Figs. 5 and 6 permits the shock-absorbing device to adjust itself to varying positions without either bending or breaking the arms 34 and without so binding the shock-absorber as to render it ineffective.

I claim as my invention:

1. A shock absorber comprising a pair of arms, the outer ends of which are adapted to move toward or away from each other, a friction band secured to one of said arms, a tension regulator upon said friction band, a disk with which said band is in frictional engagement, means connecting the other of said arms to said disk, a projecting member carried upon said last-mentioned arm, said disk being provided with a slot or recess adapted to receive said projecting member, said projecting member being adapted to engage the wall of said slot after said last-mentioned arm has moved a predetermined distance.

2. A shock absorber comprising a pair of arms, the outer ends of which are adapted to move toward or away from each other, a friction band secured to one of said arms, a tension regulator upon said friction band, a disk with which said band is in frictional engagement, means connecting the other of said arms to said disk, a projecting member carried upon said last-mentioned arm, said disk being provided with a slot or recess adapted to receive said projecting member, said projecting member being adapted to engage the wall of said slot after said last-mentioned arm has moved a predetermined distance, said last-mentioned arm being provided with a projecting bolt, said bolt being in pivotal relation with said disk.

3. A shock absorber comprising a pair of arms the outer ends of which are adapted to move toward or away from each other, a friction disk in connection with one of said arms and a friction band encircling and clamping said disk and connected to the other of said arms, a pair of lugs upon said band, one of said lugs being recessed, a bolt having a non-circular head received within said recess, a spring intermediate said head and a wall of said recess, and a locking means coöperating with one end of said bolt and with the other of said lugs.

4. A shock absorber comprising a pair of arms the outer ends of which are adapted to move toward or away from each other, a friction disk in connection with one of said arms and a friction band encircling and clamping said disk and connected to the other of said arms, a pair of lugs upon said band, a bolt cross-connecting said lugs, means for holding said bolt against rotation, a spring co-acting with said bolt, a nut bearing a toothed face secured upon said bolt, and a toothed member adapted to coöperate with said toothed face, said last-mentioned member being locked against rotary movement.

5. A shock absorber comprising a pair of arms the outer ends of which are adapted to move toward or away from each other, a friction disk in connection with one of said arms and a friction band encircling and clamping said disk and connected to the other of said arms, a pair of lugs upon said band, a bolt cross-connecting said lugs, means for holding said bolt against rotation, a spring co-acting with said bolt, a nut bearing a toothed face secured upon said bolt, and a toothed member adapted to coöperate with said toothed face, one of said lugs being recessed and said toothed member being received within said recess, said recess and said member being non-circular in shape, thereby to prevent rotation of said toothed member.

In testimony whereof I have hereunto affixed my name in the presence of two witnesses.

JOHN A. McKNIGHT.

Witnesses:
 MAY D. FLYNN,
 ROBT. KLOTZ.